United States Patent [19]

Chang

[11] Patent Number: 4,974,944
[45] Date of Patent: Dec. 4, 1990

[54] OPTICAL NONRECIPROCAL DEVICE

[75] Inventor: Kok W. Chang, Sunnyvale, Calif.

[73] Assignee: Hewlett-Packard Company, Palo Alto, Calif.

[21] Appl. No.: 222,597

[22] Filed: Jul. 21, 1988

[51] Int. Cl.$^5$ .............................................. G02B 5/30
[52] U.S. Cl. .................................... 350/377; 350/403
[58] Field of Search ............... 350/335, 375, 376, 377, 350/378, 379, 403, 400, 401, 96.15, 96.18; 370/1, 2; 455/600, 616

[56] References Cited

U.S. PATENT DOCUMENTS

| | | | |
|---|---|---|---|
| 3,272,988 | 9/1966 | Bloom et al. | 350/377 |
| 3,558,215 | 1/1971 | DeLang et al. | 350/377 |
| 4,145,607 | 3/1979 | Bates | 350/403 |
| 4,178,073 | 12/1979 | Uchida et al. | 350/151 |
| 4,239,329 | 12/1980 | Matsumoto et al. | 350/96.15 |
| 4,416,514 | 11/1983 | Plummer | 350/335 |
| 4,464,022 | 8/1984 | Emkey | 350/377 |
| 4,712,880 | 12/1987 | Shirasaki | 350/377 |

FOREIGN PATENT DOCUMENTS

| | | | |
|---|---|---|---|
| 0130934 | 7/1985 | Japan | 350/375 |
| 61-292613 | 12/1986 | Japan | 350/375 |

OTHER PUBLICATIONS

Shiraishi et al., "Cascaded Optical Isolator Configuration Having High-Isolation Characteristics Over a Wide Temperature and Wavelength Range", Optics Letters; 12, No. 7, Jul. 1987, pp. 462–464.
Shiraishi et al., "Optical Isolator for Single Mode Fiber"; Digest of European Conference of Optical Communication, vol. 2, Mar., 1989.
Fukushima et al., "Digest of Annual Meeting of Electronics and Communication Engineers of Japan", 1984, p. 335.
Azzam, "Simulation of Mechanical Rotation by Optical Rotation: Application to the Design of a New Fourier Photopolarimeter", J. Opt. Soc., Am., vol. 68, No. 4, Apr., 1978.
Swindell, "Extraordinary-Ray and Wave Tracing in Uniaxial Crystals", Applied Optics, vol. 14, No. 9, Sep., 1975.

Primary Examiner—Bruce Y. Arnold
Assistant Examiner—R. D. Shafer

[57] ABSTRACT

An optical non-reciprocal device is disclosed for passing light in the forward direction and for reducing light passing in the reverse direction. Three anisotropic crystal members are arranged in a linear array. Each member has a walk off direction for separating light into ordinary and extraordinary rays. At least one non-reversible rotation element is interposed between every two adjacent anisotropic crystal members. Rotations of the elements and the orientations and thicknesses of the anisotropic crystal members are such that light in the forward direction is separated into ordinary and extraordinary rays which substantially do not superpose each other upon emerging from the device so that light passing in the reverse direction is reduced in a manner which is substantially insensitive to temperature and wavelengths of the light passing in either direction.

17 Claims, 10 Drawing Sheets

COUPLING LOSS: $COS^4(df)$
ISOLATION: $SIN^4(df)$

COUPLING LOSS: $COS^6(df)$
ISOLATION: $SIN^6(df)$

FIG._5A.

FORWARD COUPLING LOSS: $\cos^8(df)$

FIG._5B.

REVERSE ISOLATION: $\sin^8(df)$

OPTICAL NONRECIPROCAL DEVICE

BACKGROUND OF THE INVENTION

This invention relates in general to optical non-reciprocal devices and in particular to an optical non-reciprocal device having improved performance at different temperatures and wavelengths of the light.

The use of fiberoptics in communications has developed rapidly in recent years. With such progress, new problems have arisen. Thus, when a light source transmits light through an optical fiber to another optical device, the light transmitted through the optical fiber will be reflected by an end face or other part of the optical device at the other end so that such reflected light returns to the light source. Multiple reflections on the end faces of optical fibers or other optical devices can cause echoes. These effects adversely affect the performance of the source and compromise the information communicated in the fiber.

Various optical isolators and non-reciprocal devices have been developed to overcome the problem of light reflections and echoes described above. In one type of prior art optical isolators or optical non-reciprocal devices, such device can be used only at such points where the linearity of the polarized light is maintained in the optical fibers. Furthermore, the performance of these conventional devices is severely degraded by variations in temperature and wavelength of the light through. Such prior art devices are therefore not entirely satisfactory.

In view of the drawbacks of the above-described prior art optical isolators and non-reciprocal devices, polarization independent isolators and couplers have also been developed. Described below are two optical devices which are polarization independent. Both devices employ birefringent crystals and Faraday rotators. It is known that when an anisotropic crystal is cut in a certain manner, the crystal will cause the component of light in a particular polarization direction to be diverted into a different path upon passing through the crystal. The direction of divergence is known as the walk off direction of the crystal. It is also well known that birefringent crystals will only cause the component of light in the polarization plane parallel to the walk off direction to walk off and does not affect the component with polarization in the plane perpendicular to the walk off direction. Faraday rotators are also well known to those skilled in the art as a non-reciprocal rotator and is therefore different from reciprocal rotators such as half-wave plates.

Uchida et al., in U.S. Pat. No. 4,178,073, discloses a polarization independent optical isolator employing birefringent crystals and a Faraday rotator. In the forward direction, the light passes through the following elements sequentially a first birefringent crystal, a Faraday rotator, a half-wave plate, and a second birefringent crystal. In the forward direction, the first birefringent crystal in the optical isolator divides an incident light beam into an ordinary ray and an extraordinary ray which are then synthesized into one beam when emerging from the second birefringent crystal in the isolator. In the reverse direction, however, while an incident light beam is divided again into an ordinary and an extraordinary ray, but the two rays are not synthesized upon emerging from the isolator in the reverse direction. Thus, when light passes from a first to a second optical fiber, if the optical isolator is inserted between the two fibers, the isolator will pass light in the forward direction between the two fibers but will prevent light reflections from the second fiber from being transmitted in the reverse direction to the the first fiber. In U.S. Pat. No. 4,239,329, Matsumoto discloses polarization independent optical nonreciprocal devices which achieve essentially the same result as that of Uchida et al.

While the devices disclosed by Matsumoto and Uchida et al. are advantageous over polarization dependent prior art devices, the performance of Uchida et al. and Matsumoto's devices are severely degraded by variations in temperature and wavelength of the light. It is therefore desirable to provide improved optical non-reciprocal devices which are insensitive to variations in temperature and wavelengths of the light.

SUMMARY OF THE INVENTION

The invention is directed towards an optical nonreciprocal device for passing light in the forward direction from a first point to a second point and for reducing light passing in the reverse direction from the second point to the first point. The device comprises at least three anisotropic crystal members arranged in a linear array. Each member has a walk off direction for separating light into ordinary and extraordinary rays. The device further comprises at least two non-reversible rotation elements. At least one element is interposed between every two adjacent anisotropic crystal members. Rotations of the elements and the orientations and thicknesses of the members are such that light in the forward direction is separated in the ordinary and extraordinary rays which are synthesized when they arrive at the second point, and that light in the reverse direction is separated into ordinary and extraordinary rays which substantially do not superpose each other at the first point, and so that light passing in the reverse direction is reduced in a manner which is substantially insensitive to temperature and wavelengths of the light passing in either direction.

DETAILED DESCRIPTION OF THE INVENTION

Figure 1A:
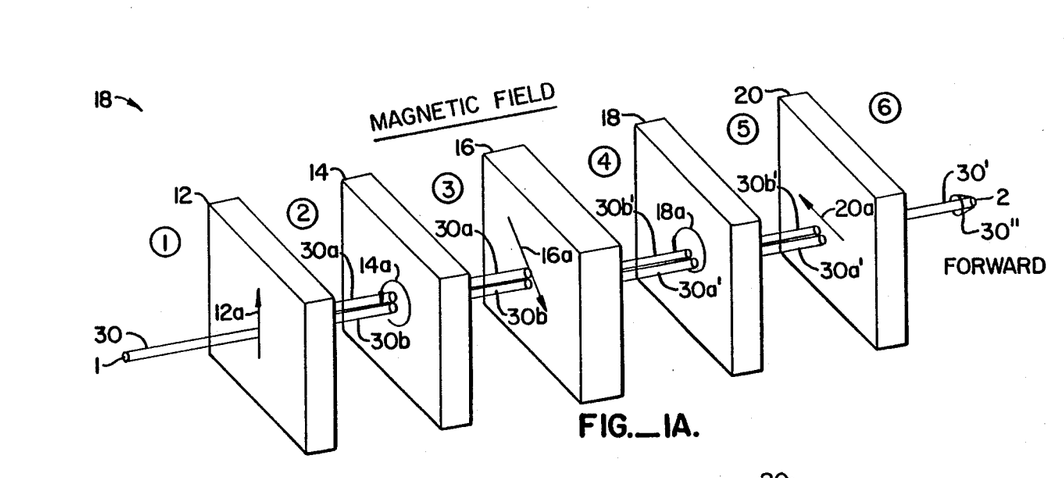
FIGS. 1A, 1B are perspective views of an array of elements constituting an optical non-reciprocal device illustrating the passage of light in the forward and reverse directions to illustrate the invention.

FIG. 1A is a perspective view of an optical non-reciprocal device and a light ray passing from point 1 through the device to point 2 in the forward direction to illustrate the invention. As shown in FIG. 1A, device 10 includes three anisotropic crystal members 12, 16, 20 and two Faraday rotators 14, 18. It will be noted that between any two anisotropic members, there is at least one Faraday rotator. In the preferred arrangement illustrated in FIG. 1A, between any two anisotropic crystal members with no other anisotropic crystal member in between, there is exactly one Faraday rotator Anisotropic crystal members 12, 16, 20 have walk off directions 12a, 16a and 20a respectively. The positions of the beam 30 and its component rays when passing through device 10 are shown as numerals within circles in FIG. 1A.

Light beam 30 at position 1 (labelled 1 within a circle in FIG. 1A) impinges on member 12 and emerges at position 2 into two rays 30a, 30b. Ray 30a has a plane of polarization parallel to 12a and ray 30b has a polarization orthogonal to direction 12a. The two rays 30a, 30b are rotated by rotator 14 and pass through member 16 with walk off direction 16a. Ray 30b remains unchanged in direction but ray 30a diverges in direction 16a for a distance proportional to the thickness of member 16. The two rays are again rotated by rotator element 18 in the direction 18a and impinges on member 20. Member 20 causes ray 30a to diverge along direction 20a so that as it emerges from member 20 at position 6, it superposes ray 30b. In such manner the two rays are synthesized by device 10 in the forward direction to give beam 30 at point 2, which is the output of the device in the forward direction.

Figure 1B:
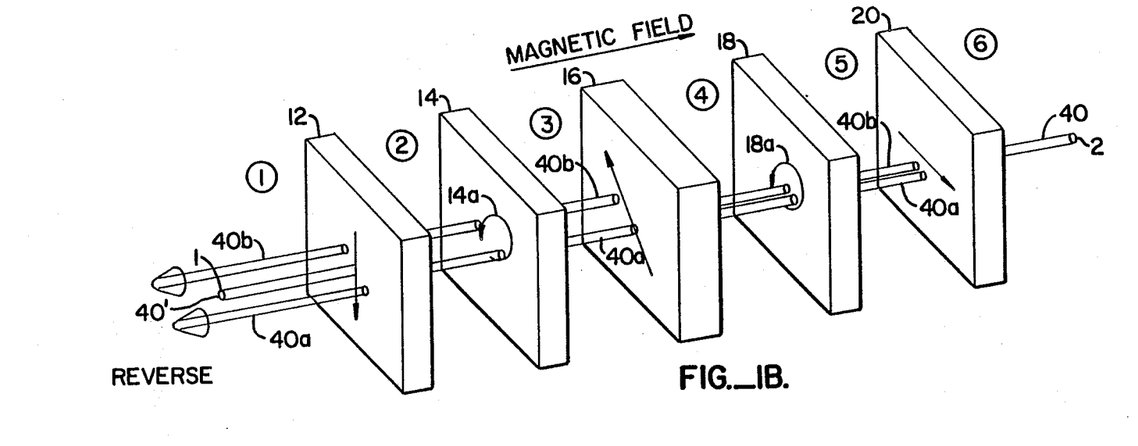

FIG. 1B is a perspective view of the device of FIG. 1A and a light beam passing through the device in the reverse direction. As shown in FIG. 1B beam 40 at point 2 (position 6) is split into two rays 40a, 40b by anisotropic member 20 at position 5. Faraday rotator 18 is non-reciprocal so that it rotates rays 40a, 40b in the same direction 18a. Member 16 causes ray 40b to be moved so that the positions of the two rays are as shown in position 3 in FIG. 1B. Faraday rotator 14 is non-reciprocal and rotates the two rays in direction 14a as shown. Member 12 causes ray 40a to be moved so that the two rays are at positions as shown in position 1 in FIG. 1B. It will be observed that neither ray superposes the original direction of beam 40 shown as 40' in FIG. 1B. Therefore if beam 30 originates from point 1 in position 1 and reaches point 2 in position 6 in FIG. 1A, the beam 40 originating from the point 2 towards point 1 will end up in two rays at positions 40a, 40b away from point 1. In this manner, device 10 permits the light of any polarization to continue in its original direction in the forward direction but causes light in the reverse direction to diverge from its original direction. In such manner, light leaving a first optical fiber at point 1 (position 1) will pass through device 10 and reach a second fiber at point 2 (position 6) where light originating from the second fiber at point 2 will diverge into rays such as 40a, 40b and will not reach the first optical fiber at point 1. Device 10 can therefore be used as an optical isolator which is polarization independent.

Figure 2A:
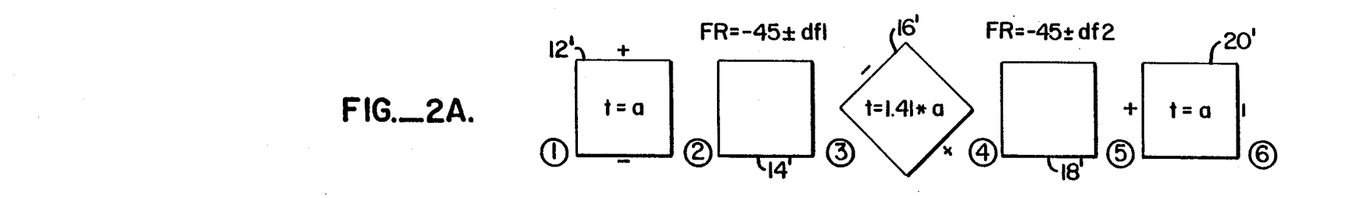
FIG. 2A are cross-sectional views of the five elements of FIGS. 1A, 1B, where the cross-sectional views are arranged side-by-side in the same order as in the array to illustrate the invention.

FIG. 2A are cross-sectional views of elements 12, 14, 16, 18, 20 taken along planes perpendicular to the path of beam 30 and looking into the beam 30, where the views are arranged from left to right in the same order as the array in FIG. 1A to illustrate the invention. Thus, the cross-sectional view 12' of element 12 is obtained when viewed in the direction opposite to arrow 30" of FIG. 1A. Similarly 14', 16', 18' and 20' are cross-sectional views of elements 14–20 also viewed in the direction opposite to that of arrow 30" of FIG. 1A. The walk off directions of elements 12, 16 and 20 in the forward direction are in the directions from the minus (−) to the plus (+) in FIG. 2A. The walk off directions of elements 12, 16, 20 in the reverse direction are in the directions from the plus (+) to the minus in FIG. 2A.

Figure 2B:
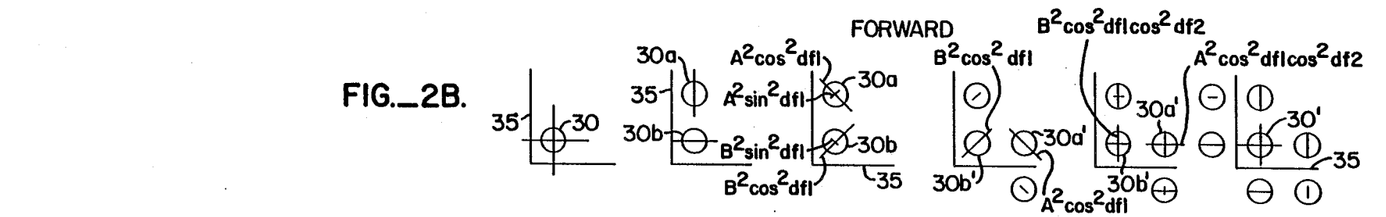
FIGS. 2B, 2C illustrate the positions of light rays passing through the optical non-reciprocal device of FIG. 1A, 1B in the forward and reverse directions respectively.

FIG. 2B illustrates the positions of beam 30 and its component rays in the forward direction at positions 1–6 in FIGS. 1A, 2A, as well as the coupling or insertion loss due to the error in rotation by rotators 14 and 18. It is known that the rotations of Faraday rotators 14 and 18 are influenced by temperature and wavelength of the light. Thus, even though rotators 14 and 18 have been set to perform a 45° rotation at a certain temperature and wavelength of the light, temperature and wavelength variations will introduce an error angle in rotation of rotator 14, df1, and an error angle in the rotation of rotator 18, df2.

As shown in FIGS. 1A, 2A and 2B, beam 30 is split into two rays 30a and 30b in position 2 by anisotropic crystal member 12, where ray 30a has amplitude $A^2$ and ray 30b has amplitude $B^2$. In FIG. 2B, positions of beam 30 and rays 30a, 30b are shown relative to axis 35. Thus, in reference to FIG. 2B at positions 1 and 2 respectively, beam 30 has two components, one polarized along the walk off direction of member 12 and one component perpendicular to such direction. The component whose plane or polarization is parallel to the walk off direction diverges from the original direction of beam 30 and emerges as ray 30a in position 2. The component of beam 30 with the plane of polarization perpendicular to the walk off direction emerges as ray 30b in position 2 in the original direction of beam 30. Rays 30a, 30b are then rotated by rotator 14 and emerge at position 3.

Temperature changes and variations of the wavelengths of the light will introduce an error angle df1 in the rotation of rotator 14, so that the resulting planes of polarization of rays 30a and 30b at position 3 will not be exactly 45° from those at position 2. Instead the polarizations will be off from the 45° position by an error angle df1. For convenience in description, the planes of polarization of rays 30a, 30b which would have resulted had the rotation of rotator 14 been exactly at 45° are taken as the reference planes in FIG. 2B. The error angle df1 will cause the actual planes of polarization of rays 30a and 30b to deviate by an angle df1 from said reference planes at position 3. Therefore, ray 30a will have a main component $A^2\cos^2 df1$ along one reference plane and a minor component $A^2\sin^2 df1$ along the other reference plane, such two components being shown at position 3 in FIG. 2B. Similarly, ray 30b will have main component $B^2\cos^2 df1$ along one reference plane and minor component $B^2\sin^2 df1$ along the other reference plane all as illustrated in FIG. 2B.

As shown in FIGS. 1A and 2A, member 16 has a walk off axis which is rotated 135° from that of crystal member 12. As shown in FIG. 2B, the main component of ray 30a will diverge when passing from position 3 to position 4 (labelled 30a') while the minor component whose amplitude is $A^2\sin^2 df1$ will remain unchanged in direction. For ray 30b, the main component $B^2\cos^2 df1$ will remain unchanged in direction but the minor component having amplitude $B^2\sin^2 df1$ will diverge when ray 30b passes between positions 3 and 4. Consequently, 4 rays will be observed at position 4 instead of only 2. For simplicity only the main ray components (that is, the components with the amplitudes $A^2\cos^2 df1$, $B^2\cos^2 df1$) are shown in FIG. 1A. Because of the further splitting of rays 30a and 30b when passing from position 3 to position 4, the main rays have been labelled 30a' and 30b' respectively. These four rays are again rotated by rotator 18 as shown in FIG. 2B. While rotator 18 has been set to rotate the planes of polarizations of light by 45° at certain temperatures and wavelengths, temperature and wavelengths variations will introduce an error angle df2 in the rotation of rotator 18.

Thus, rays 30a' and 30b' will each again have two components: a main component along a reference plane (defined in a manner similar to reference plane of ray 30a at position 3) having the amplitude $A^2\cos^2 df1\cos^2 df2$ and a minor component $A^2\cos^2 df1\sin^2 df2$. Similarly, ray 30b' will have a main component $B^2\cos^2 df1\cos^2 df2$ along its reference plane (defined in the same manner as the reference plane of ray 30b in position 3) of amplitude $B^2\cos^2 df1\cos^2 df2$ and a minor component $B^2\cos^2 df1\sin^2 df2$. Member 20 will cause the four rays to further split into eight rays at position 6. The main components of rays 30a', 30b' will superpose and form a beam 30' which is along the original direction of beam 30 at position 1. The amplitude of beam 30' will therefore be $(A^2+B^2)\cos^2 df1\cos^2 df2$. The insertion loss is therefore $\cos^2 df1\cos^2 df2$.

Figure 2C:
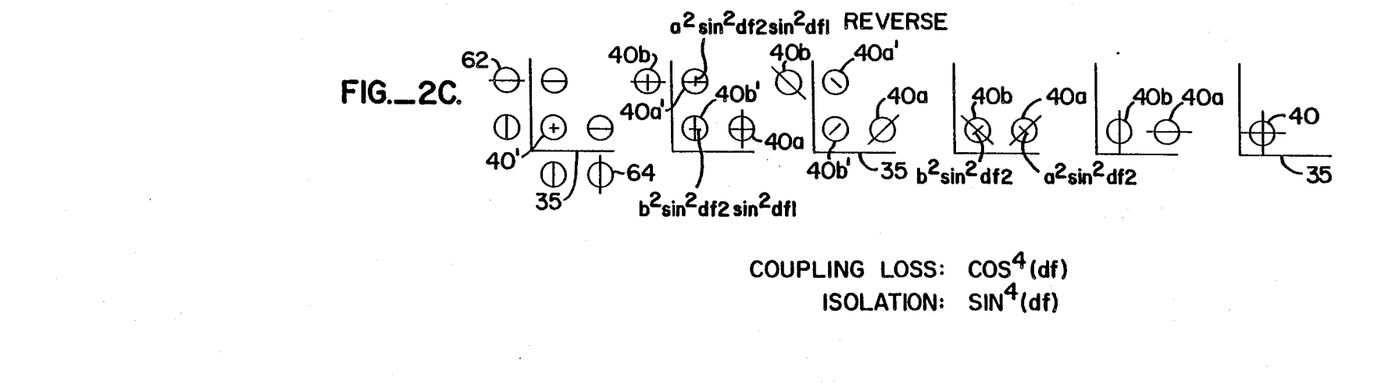

In the reverse direction illustrated in FIG. 2C, beam 40 at position 6 will be split by member 20 into rays 40a, 40b. The two rays are rotated by rotator 18 which again introduces an error angle in rotation df2 so that ray 40a at position 4 will have a main component whose amplitude is $a^2\cos^2 df2$ and a minor component whose amplitude is $a^2\sin^2 df2$. Ray 40b will have similar components. Member 16 will cause the two rays to further split into four rays 40a, 40a', 40b, 40b' when passing from position 4 to position 3 as shown in FIG. 2C. The four rays are again rotated by rotator 14 which introduces an error angle df1 so that each of the four rays will each have two components, a major and a minor component. Thus ray 40a' will have a major component whose amplitude is $a^2\sin^2 df2\cos^2 df1$ and a minor component whose amplitude is $a^2\sin^2 df2\sin^2 df1$. Similarly ray 40b' will have a major component whose amplitude is $b^2\sin^2 df2\cos^2 df1$ and a minor component whose amplitude is $b^2\sin^2 df2\sin^2 df1$. Member 12 will cause the four rays to be further split when emerging at position 1, where the minor components of rays 40a', 40b' superpose to form one ray 40'. As shown in FIG. 2C, the beam 40' which emerges at point 1 of FIG. 1A and FIG. 2C will have the amplitude $(a^2+b^2)\sin^2 df1\sin^2 df2$. Hence the isolation of device 10 will be $\sin^2 df1\sin^2 df2$.

In the devices disclosed by Matsumoto and Uchida et al. discussed above, only one Faraday rotator is used. Such rotator will introduce an error angle df in the same manner as rotators 14, 18 of FIGS. 1A, 1B and 2A–2C Thus the insertion loss in the devices of Matsumoto and Uchida et al. will be $\cos^2 df$ and its isolation only $\sin^2 df$. The error angles introduced by the Faraday rotators can be significant. Thus, errors caused by temperature and wavelength variations can degrade the performance of Uchida et al.'s and Matsumoto's devices so that it can be shown that the isolation for such devices is only $20(\log_{10}(\sin df))$dB. The device 10 of FIGS. 1A–2C further reduces the amount of light passed in the reverse direction by another factor of $\sin^2 df$ so that the isolation is $40(\log_{10}(\sin df))$dB. The amount of light passed in the direction is reduced by another factor of $\cos^2 df$. Thus, for a slight reduction of light passed in the forward direction, device 10 achieves a much better isolation in the reverse direction. For this reason device 10 is advantageous over those of Matsumoto and Uchida et al. in that while the insertion loss of device 10 is only slightly worse than the devices of Matsumoto and Uchida et al., the isolation of device 10 is much improved over such devices.

Appendix A is a table showing the dimensions and characteristics of optical isolators employing Faraday rotators with two types of films of different chemical compositions. The thicknesses of the two types of films shown in the table are chosen to obtain a rotation of 45° at two different wavelengths: 1.3 and 1.55 microns. It will also be observed from the table in Appendix A that the amount of rotation can vary significantly with change of temperature. Thus, even though a thickness of a rotator film is chosen to give 45° rotation at a particular temperature, when the temperature changes, the rotation of the film will deviate from 45° significantly. This becomes a significant problem for Uchida et al's and Matsumoto's devices described above.

Figure 3A:
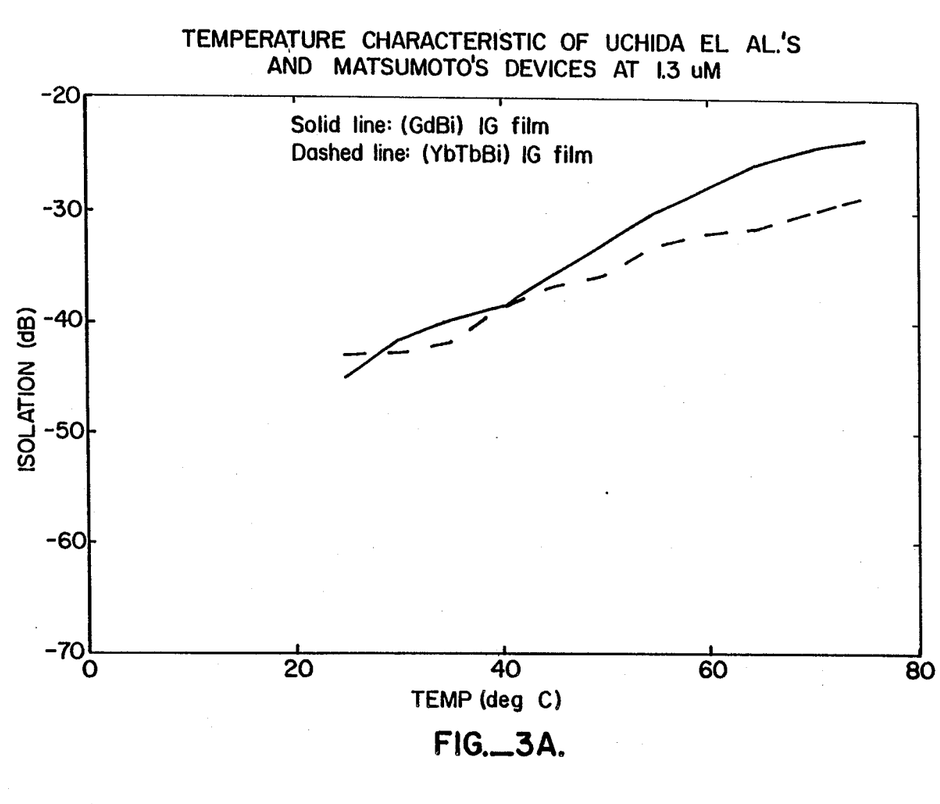
FIG. 3A is a graphical illustration of the isolation of the devices disclosed by Uchida et al. and Matsumoto.
Figure 3B:
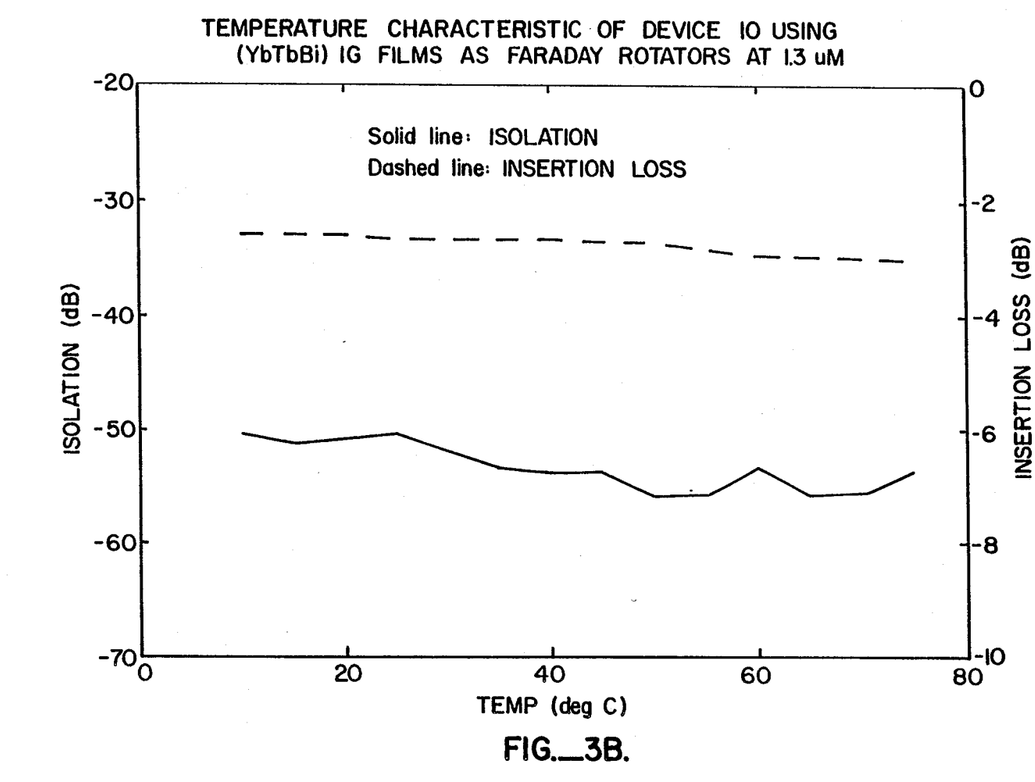
FIGS. 3B, 3C are graphical illustrations of the coupling or insertion loss and of isolation of the device of FIGS. 1A, 1B.
Figure 3C:
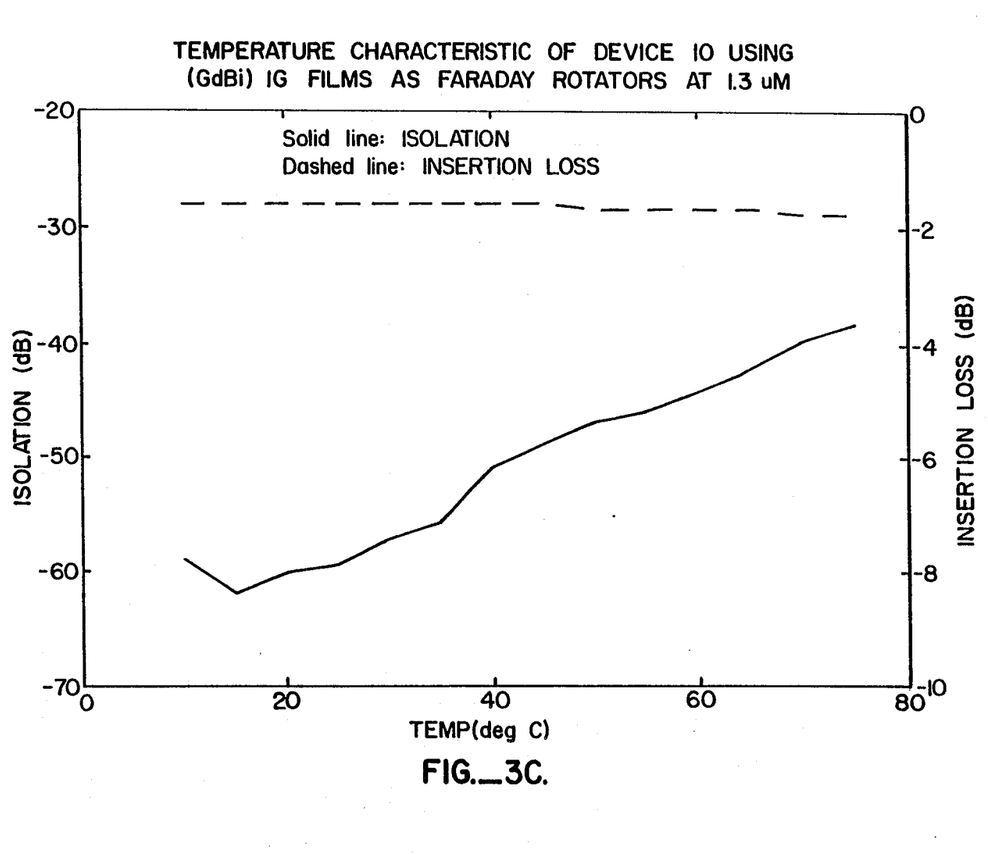

FIG. 3A is a graphical illustration of the isolation of the polarization independent isolator designs by Uchida et al. and Matsumoto described above. As shown in FIG. 3A, the isolation achieved is reduced to within a range of −25 dB to −30 dB at high temperatures. For device 10, in contrast, the isolation achievable even at high temperatures is much better than those of Ocheda et al's and Matsumoto's, as shown in FIGS. 3B, 3C. Thus using the (YbTb)IG films as Faraday rotators, the isolation remains at about −50 dB over a wide temperature range. Using Faraday rotators of another composition as shown in FIG. 3C, the isolation remains as high as −35 to −40 dB even at high temperatures.

Figure 3D:
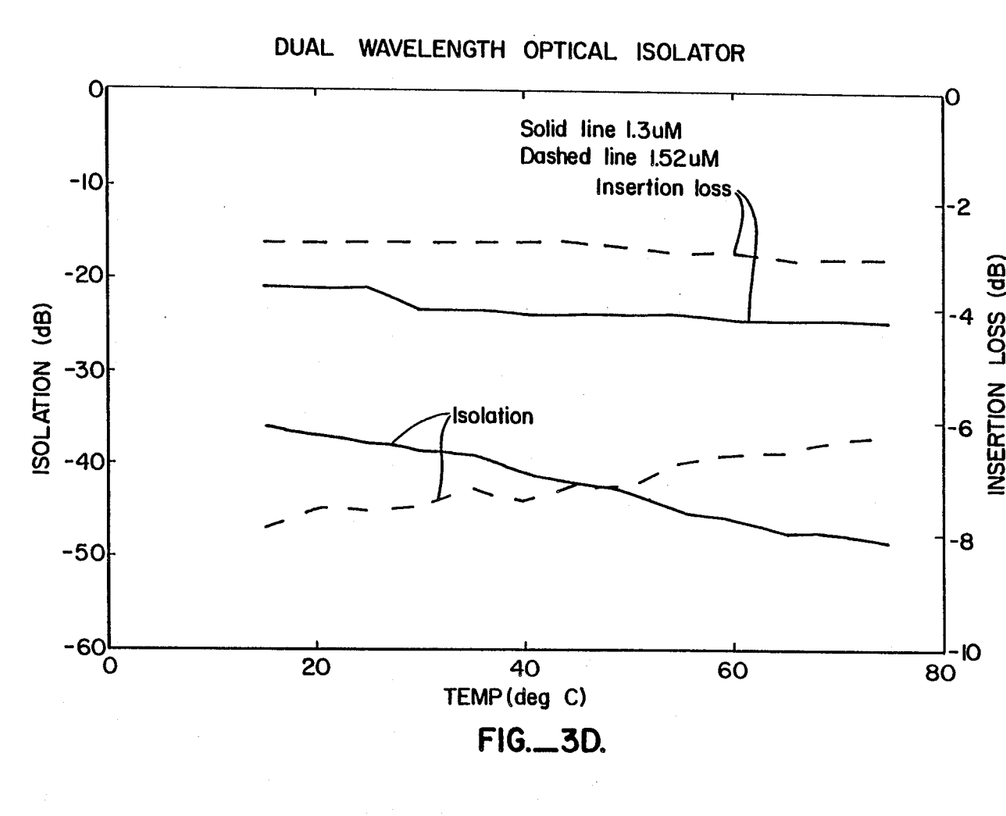
FIG. 3D is a graphical illustration of the coupling loss and isolation of a dual wavelength optical isolator based on the design of FIGS. 1A, 1B to illustrate the preferred embodiment of the invention.

The amount of rotation of a particular Faraday rotator is a function of both temperature and wavelength of the light Therefore if it is contemplated that the optical isolator is to be used for isolating light of different wavelengths, it is possible to improve the performance of device 10 further by choosing rotators which are optimized at different wavelengths. Thus, two commonly used wavelengths for optical communication are 1.3 and 1.55 microns. It is therefore possible to further optimize the isolation of device 10 by using one Faraday rotator which rotates light at 1.3 microns by 45° and the other rotator optimized for rotating light at 1.55 microns for 45°. The coupling loss and isolation achievable by such dual wavelength optical isolator are illustrated in FIG. 3D. Thus as shown in FIG. 3D, the dual wavelength optical isolator has high tolerance of temperature and wavelength variations. Despite variations in both parameters, the isolation achievable still exceeds −35 dB. If the optical isolator includes more than two Faraday rotators as in embodiment described below, it may be desirable to optimize the rotations of two of the films, one at 1.3 microns and the other at 1.55 microns and the remaining rotators at wavelengths which are between 1.3 and 1.55, such as at evenly spaced intervals. Thus, if the isolator includes three rotators, the third rotator would be optimized to rotate 45° at 1.42 microns which is at the halfway point between 1.3 and 1.55 microns. If the isolator includes four rotators, two rotators are optimized at 1.3 and 1.55 microns with the remaining two rotators optimized to rotate 45° at wavelengths which are evenly spaced at intervals of about $\frac{1}{3}$ of the difference between 1.3 and 1.55 microns, or at 1.38 and 1.46 microns approximately.

With existing designs, since the rotations of the Faraday rotators vary significantly with temperature and wavelength, it may be necessary to re-orient the walk-off directions of the anisotropic crystal members to maximize the isolation. With the design in device 10, since good isolation is achieved throughout a wide range of operating temperatures and wavelengths, such adjustment is no longer necessary. This greatly improves the efficiency for installing such isolators.

Figure 4A:
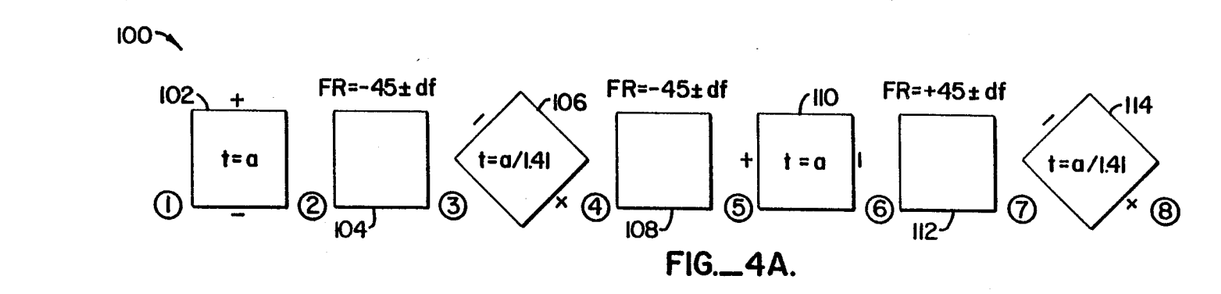
FIG. 4A are cross-sectional views of the elements of another optical non-reciprocal device arranged in a manner similar to that in FIG. 2A to illustrate the invention.

The concept underlying device 10 can be further extended to provide devices which can provide even higher isolation than device 10. Such devices are illustrated in FIGS. 4A–4C and 5A–5C. As shown in FIG. 4A, device 100 comprises four anisotropic members 102, 106, 110 and 114 and three Faraday rotators 104, 108, and 112 where between each two adjacent anisotropic crystal members there is one rotator. Members 106, 114 have walk off directions which are rotated 135° relative to that of member 102. Member 110 has its walk off direction rotated 270° or −90° from that of member 102. While rotators 104, 108 and 112 are shown in FIG. 4A to introduce the same error angle df for simplicity of illustration, it will be understood that they can introduce different error angles; all such configurations are within the scope of the invention. Since the amount of divergence between the different rays are determined by the thicknesses of the anisotropic crystal members, the thicknesses (as well as the orientations) of the members should be chosen to achieve the result desired: synthesis into one beam in the forward direction and isolation in the reverse direction. As shown in FIG. 4A, members 102, 110 each have thickness a and members 106, 114 is each about a/1.41 in thickness.

With the arrangement of device 100 in FIG. 4A, the different rays passing in the forward direction are illustrated in FIG. 4B, again the positions of the rays are those observed looking into the incoming beam from position 8. Similarly, the positions of the rays in the reverse direction are those observed at position 1 looking into the incoming beam as illustrated in FIG. 4C. From FIGS. 4A–4C, it will be observed that the coupling or insertion loss of device 100 will be $\cos^6 df$ and its isolation $\sin^6 df$. If rotators 104, 108, 112 have error angles df1, df2, df3 respectively instead of the same angle df, then the coupling loss will be $\cos^2 df1 \cos^2 df2 \cos^2 df3$ and its isolation $\sin^2 df1 \sin^2 df2 \sin^2 df3$. Hence, device 100 suffers again only a slight loss of amplitude in the forward direction but provides better isolation even as compared to device 10 of FIGS. 1A–2C.

Figure 5A:
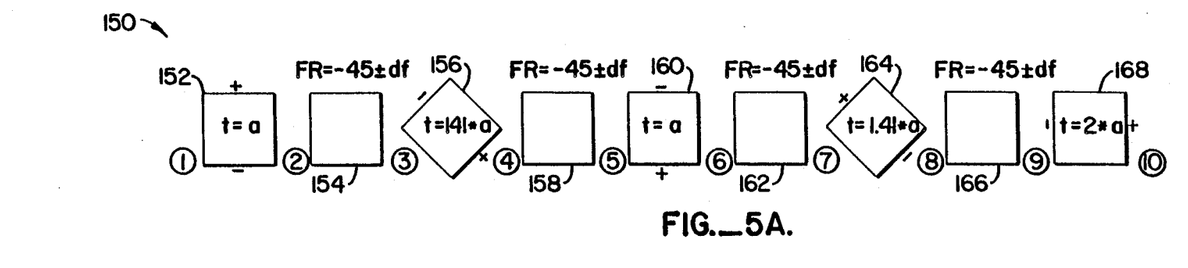
FIG. 5A are cross-sectional views of the elements of yet another optical non-reciprocal device arranged in a manner similar to that in FIG. 2A to illustrate the invention.
Figure 5B:
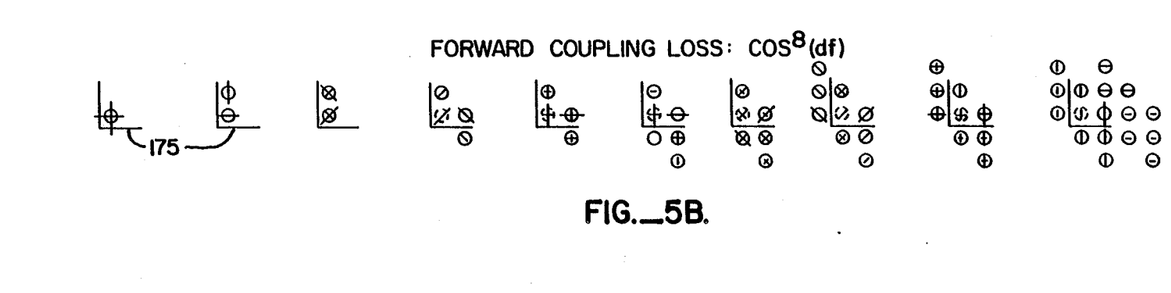
FIGS. 5B, 5C illustrate the positions of light rays passing in the forward and reverse directions in the device of FIG. 5A.
Figure 5C:
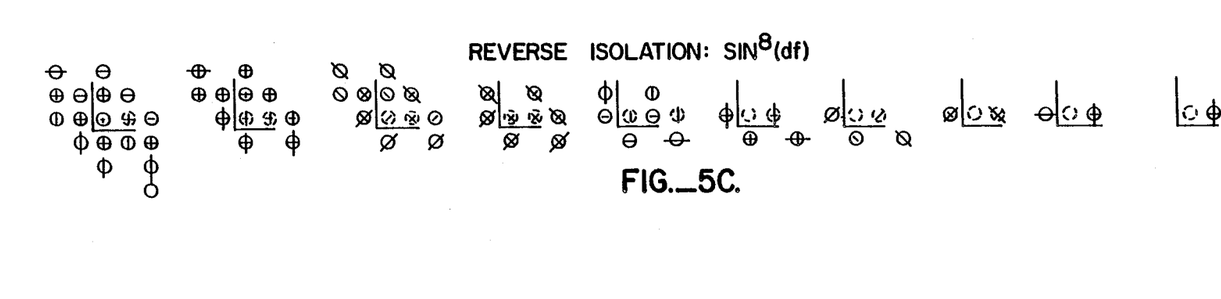

FIGS. 5A–5C illustrate yet another device 150 which provides superior isolation at only a further slight increase of coupling loss. FIG. 5A illustrates the cross-sectional views of each of the elements in device 150 taken in a manner similar to that of FIG. 2A.

Illustrated in FIG. 5A are cross-sectional views of nine elements arranged in a linear array between ten positions of an incoming light beam in a manner similar to that of FIG. 1A, where the cross-sectional views of the nine elements are arranged side by side in a manner similar to that of FIG. 2A. As shown in FIG. 5A, anisotropic crystal members 152, 160 have thicknesses approximately equal to a, members 156 and 164 each has thickness of about $1.41a$ and member 168 has a thickness of about 2a. Members 156, 160, 164 and 168 have their walk off directions oriented at about 135, 180, 315 and 90 degrees relative to the walk off direction of member 152. Faraday rotators 154, 158, 162 and 166 each rotates the incoming light beam by 45° but will introduce an error angle df caused by temperature and wavelength variations. While for simplicity the error angle introduced by the four crystals are shown to be the same quantity df, it will be understood that the four rotators may introduce different error angles and such implementations are within the scope of the invention.

Figure 4B:
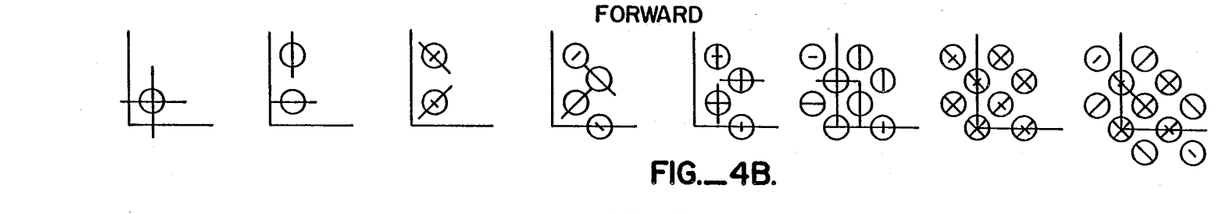
FIGS. 4B, 4C illustrate the positions of the light rays passing in the forward and reverse directions in the device of FIG. 4A.
Figure 4C:
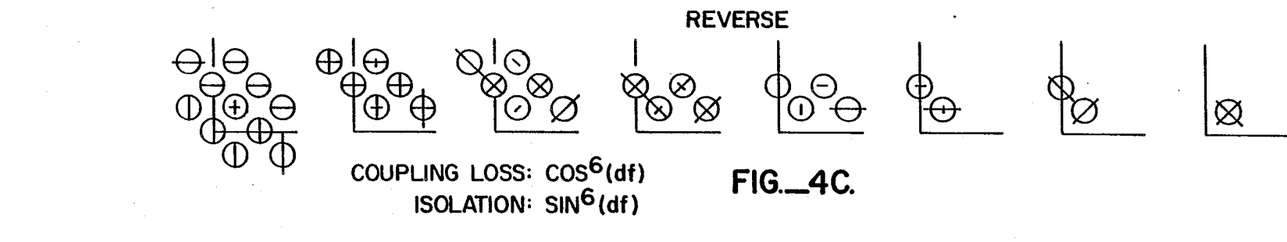

FIG. 5B illustrates the positions of the incoming beam, and the different rays into which the beam is split at the ten positions relative to an axis 175 in a manner similar to those of FIGS. 2B and 4B, where the incoming beam is passing in the forward direction relative to device 150. When calculated in a manner similar to that described above for devices 10 and 100, the forward coupling loss of device 150 is proportional to $\cos^8 df$. For simplicity, only the rays with the highest intensity have been shown in FIG. 5B.

FIG. 5C illustrates the positions of a beam passing in the reverse direction and the rays into which the beam is split by device 150 relative to axis 175; again some of the rays of lesser intensities have been omitted to simplify the diagram. In a manner similar to the embodiments described above, the isolation of device 150 in the reverse direction is $\sin^8 df$. If the rotators 154, 158, 162, 166 introduce different error angles df1, df2, df3, df4, the forward coupling loss of device 150 will be proportional to $\cos^2(df1)\cos^2(df2)\cos^2(df3)\cos^2(df4)$ and the reverse isolation of device 150 will be $\sin^2(df1)\sin^2(df2)\sin^2(df3)\sin^2(df4)$.

The general configuration of the invention as embodied in devices 10, 100 and 150 is as follows. The device includes at least three anisotropic crystal members arranged in a linear array. Between any two adjacent anisotropic crystal members is at least one non-reversible rotation element such as a Faraday rotator. The orientations and thicknesses of the anisotropic crystal members are such that light in the forward direction is separated into different rays and then synthesized into one beam in the forward direction. Since the error angle is typically quite small the coupling loss does not significantly degrade the performance of the device. Since the devices have excellent isolation, their performance as isolators are therefore substantially insensitive to temperature and wavelengths of the light. Obviously more than 5 anisotropic crystal members and more than four Faraday rotators arranged with at least one rotator between any two anisotropic crystal members may be constructed in accordance with the principles of this invention and are therefore within the scope of this invention.

Figure 6A:
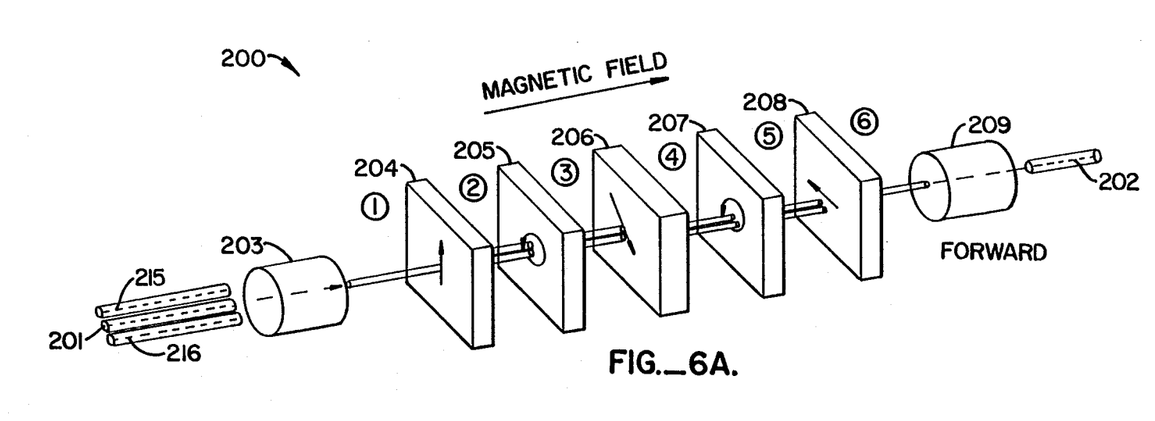
FIGS. 6A, 6B are perspective views of still another optical non-reciprocal device illustrating the invention.
Figure 6B:
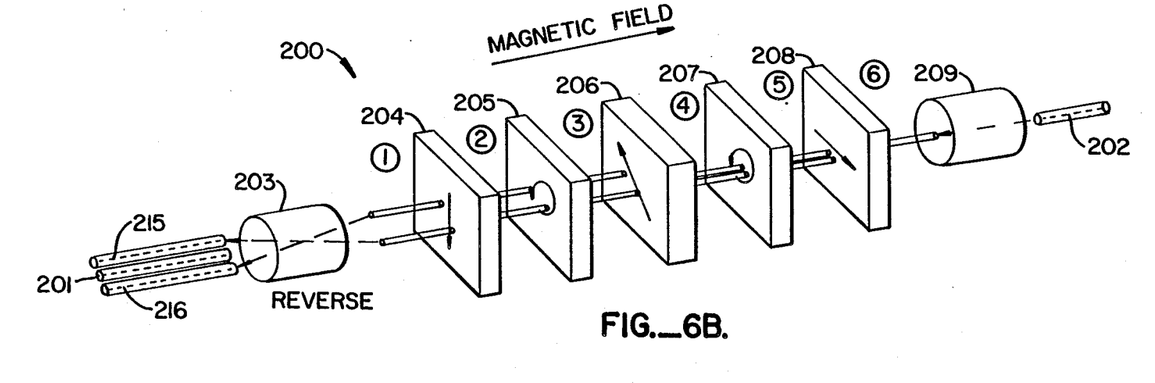

FIG. 6A is a perspective view of a device 200 for isolating and detecting the amount of light reflected when light is passed from the first optical fiber 1 to a second optical fiber 2. As shown in FIG. 6A, light passing through an optical fiber 201 is focused by a lens 203 and passed through anisotropic members 204, 206, 208 and Faraday rotators 205, 207 arranged as shown in FIG. 6A. The emerging light at position 6 is focused by lens 209 onto fiber 202. Aside from the employment of two lenses 203, 209, device 200 is identical to device 10 of FIG. 1A. Devices 100, 150 and other devices of such configuration may also be used and are within the scope of the invention.

Thus, as described above in reference to FIG. 1A, light from fiber 201 will be transmitted to fiber 202 with only a small coupling loss proportional to cos(4)df, where df is the error angle introduced by rotator 205, 207. As also described above in reference to FIG. 1B and FIG. 2C, a beam in the reverse direction will be split into seven rays where only a ray of very small intensity will be transmitted back into fiber 201. The remaining six rays will not be transmitted to fiber 201 so that device 200 achieves excellent isolation. As will be observed from FIG. 2C, of the remaining six rays which are not transmitted to fiber 201 in the reverse direction, rays 62, 64 have the strongest intensities. Therefore if two extra fibers 215 and 216 are placed adjacent to fiber 201 to receive rays 62, 64, the intensity of the light transmitted in the reverse direction originating from fiber 202 is indicated by the intensity of the light transmitted to fibers 215, 216. Device 200 therefore includes two extra fibers 215, 216 placed adjacent to fiber 201 in such spatial relationship that they are in position to receive rays 62, 64. Device 200 is therefore suitable for measuring the amount of reflections from fiber 202 when light is transmitted in the forward direction from fiber 201 to fiber 202 through device 200. When light is so transmitted, most of the light will be transmitted through fiber 202; however, a small amount of reflection will be reflected off the end face of fiber 202 back towards fiber 201. Such light reflected will travel in the reverse direction through device 200 and a major part of such energy will be captured by fibers 215, 216. The intensity of light captured by fibers 215, 216 is therefore an indication of the strength of the reflection from fiber 202. It will be noted that device 200 is suitable for measuring the strength of the reflections even though the light transmitted from fiber 201 towards fiber 202 has unknown polarization.

Figure 7A:
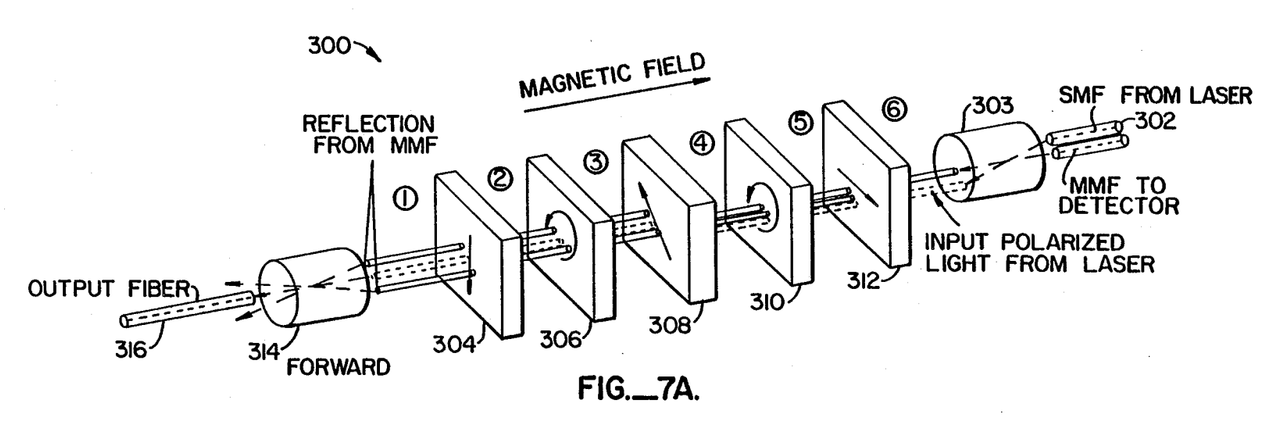
FIGS. 7A, 7B are perspective views of another optical non-reciprocal device illustrating the invention.
Figure 7B:
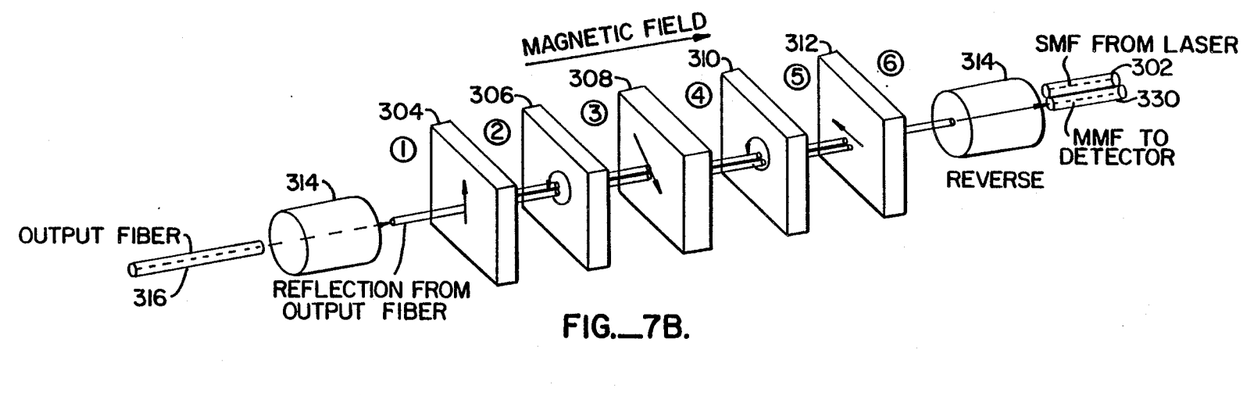

FIGS. 7A, 7B are perspective views of a device 300 for measuring the reflections from an output fiber when polarized light from a laser is transmitted from a single mode fiber. As shown in FIGS. 7A, light of known polarization from a laser is transmitted from a single mode fiber 302 through lens 303 towards a liner array of elements forming device 10 of FIG. 1A in the "reverse" direction as defined in FIGS. 1A, 2A. As shown in FIG. 7A, the passage of light from fiber 302 in FIG. 7A is shown in solid lines. Fiber 302 is not aligned with output fiber 316 but is located such that the light passing through device 300 from position 6 and emerging at position 1 will be focused by lens 314 onto fiber 316. Thus in reference to FIG. 7A, light from fiber 302 has a polarization substantially perpendicular to the walk off direction of crystal member 312. For this reason, member 312 does not cause the direction of light originating from fiber 302 to diverge between positions 6 and 5. The light is rotated by rotator 310. Member 308, however, does cause the position of the beam to move along its walk off direction as shown. After being rotated by rotator 306, the polarization of the light is again normal to the walk off direction of member 304 so that its direction remains unchanged when passing from position 2 to position 1 and is then focused by lens 314 onto fiber 316.

The reflections from the output fiber 316, however, is transmitted by device 300 to a single fiber 330 which is connected to a connector for detecting magnitude of such reflection. When such reflections are transmitted from the output fiber 316 towards fiber 330, device 300 functions in the same manner as device 10 when light is transmitted in the forward direction so that the reflections from the end phase of fiber 316 will be transmitted to fiber 330 where the two fibers are aligned. In such manner, only one fiber 330 captures a substantial part of the light reflected from 316 for detecting the amount of reflections of the end phase of fiber 316.

The above-described details of implementation and method are merely illustrative of the invention. The scope of the invention is limited only by the appended claims.

APPENDIX A

| Sample | Magneto-optical properties of Bi-substituted garnet thick film for optical isolator | | | |
|---|---|---|---|---|
| | $(GdBi)_3(FeAlGa)_5O_{12}$ | | $(YbTbBi)_3Fe_5O_{12}$ | |
| Wavelength ($\mu m$) | 1.3 | 1.55 | 1.3 | 1.55 |
| Faraday rotation (deg/cm) | 1300 | 900 | −1800 | −1200 |
| Thickness ($\mu m$) | 350 | 500 | 250 | 375 |
| Insertion loss (dB) | 0.2 | 0.4 | 0.3 | 0.3 |
| Isolation (dB) | 43 | 34 | 42 | 40 |
| $d\theta/dT$ (deg/K) | −0.11 | −0.16 | 0.06 | 0.07 |
| Magnetic field for saturation (Oe) | 200 | 200 | 1000 | 1000 |

I claim:

1. An optical nonreciprocal device for passing light in a forward direction from a first point to a second point and for reducing light passing in a reverse direction from the second point to the first point, said device comprising:
   at least three anisotropic crystal members arranged in a linear array, each member having a walk off direction for separating light into ordinary and extraordinary rays; and
   at least two non-reversible rotation elements, wherein at least one element is interposed between every two adjacent anisotropic crystal members, and wherein rotations of the elements and the orientations and thicknesses of the members are such that light in the forward direction is separated into ordinary and extraordinary rays which are synthesized when they arrive at the second point, and that light in the reverse direction is separated into ordinary and extraordinary rays which substantially do not superpose each other at the first point, and so that light passing in the reverse direction is reduced in a manner which is substantially insensitive to temperature and wavelengths of the light passing in either direction, said device consisting of three anisotropic crystal members and two non-reversible rotation elements,
wherein said array comprises a first member closest to the first point, a second member in the middle and a third member closest to the second point, wherein the first and third members have substantially the same thickness and the thickness of the second member has a thickness which is substantially 1.41 times the thickness of the other two members, and wherein the walk off directions of the second and third members are oriented about 135 and 270 degrees respectively relative to that of the first member.

2. The device of claim 1, wherein the rotation elements each rotates the ordinary and extraordinary rays by about 45 degrees at predetermined light wavelengths.

3. The device of claim 2, wherein a first rotation element rotates rays of light at a first wavelength by about 45 degrees, and a second element rotates rays of light at a second wavelength by about 45 degrees, so that the device is effective for reducing light transmission in the reverse direction at both the first and second wavelengths.

4. The nonreciprocal device of claim 3, wherein the first wavelength is about 1.3 microns and the second wavelength is about 1.55 microns.

5. The device of claim 1, wherein the rotations of the elements are affected by temperature and wavelengths of the rays so that the rotation caused by each element will deviate by an error angle from a predetermined rotation angle, wherein the rotation caused by a first element will deviate by a first error angle df1, that caused by a second element will deviate by a second angle df2, so that the coupling loss is proportional to $(\cos^2 df1)(\cos^2 df2)$, and so that the isolation is proportional to $(\sin^2 df1)(\sin^2 df2)$.

6. An optical nonreciprocal device for passing light in a forward direction from a first point to a second point and for reducing light passing in a reverse direction from the second point to the first point, said device comprising:
at least three anisotropic crystal members arranged in a linear array, each member having a walk off direction for separating light into ordinary and extraordinary rays; and
at least two non-reversible rotation elements, wherein at least one element is interposed between every two adjacent anisotropic crystal members, and wherein rotations of the elements and the orientations and thicknesses of the members are such that light in the forward direction is separated into ordinary and extraordinary rays which are synthesized when they arrive at the second point, and that light in the reverse direction is separated into ordinary and extraordinary rays which substantially do not superpose each other at the first point, and so that light passing in the reverse direction is reduced in a manner which is substantially insensitive to temperature and wavelengths of the light passing in either direction,
said device consisting of four anisotropic crystal members and three non-reversible rotation elements, wherein the array comprises a first member closest to the first point, a fourth member closest to the second point, a second member adjacent to the first member and a third member between the second and fourth members, wherein the first and third members have substantially the same thickness a and the second and fourth members have substantially the same thickness a/1.41, and wherein the second, third and fourth members are oriented so that their walk off directions are respectively 135, 270, and 135 degrees relative to that of the first member.

7. The device of claim 6, wherein a first rotation element rotates rays of light at a first wavelength by about 45 degrees, and a second element rotates rays of light at a second wavelength by about 45 degrees, and the third element rotates rays of light by about 45 degrees where such rays of light have a wavelength which is approximately the arithmetic means of the first and second wavelengths so that the device is effective for reducing light transmission in the reverse direction at both the first and second wavelengths and at wavelengths between the first and second wavelengths.

8. The device of claim 7, wherein the first wavelength is about 1.3 microns and the second wavelength is about 1.55 microns.

9. The device of claim 6, wherein the rotations of the elements are affected by temperature and wavelengths of the rays so that the rotation caused by each element will deviate by an error angle from a predetermined rotation angle, wherein the rotation caused by a first element will deviate by a first error angle df1, that caused by a second element will deviate by a second angle df2, that caused by a third element will deviate by a third angle df3, so that the coupling loss is proportional to $(\cos^2 df1)(\cos^2 df2)(\cos^2 df3)$, and so that the isolation is proportional to $(\sin^2 df1)(\sin^2 df2)(\sin^2 df3)$.

10. An optical nonreciprocal device for passing light in a forward direction from a first point to a second point and for reducing light passing in a reverse direction from the second point to the first point, said device comprising:
at least three anisotropic crystal members arranged in a linear array, each member having a walk off direction for separating light into ordinary and extraordinary rays; and
at least two non-reversible rotation elements, wherein at least one element is interposed between every two adjacent anisotropic crystal members, and wherein rotations of the elements and the orientations and thicknesses of the members are such that light in the forward direction is separated into ordinary and extraordinary rays which are synthesized when they arrive at the second point, and that light in the reverse direction is separated into ordinary and extraordinary rays which substantially do not superpose each other at the first point, and so that light passing in the reverse direction is reduced in a manner which is substantially insensitive to temperature and wavelengths of the light passing in either direction, said device consisting of four anisotropic crystal members and three non-reversible rotation elements, wherein the array comprises a first member closest to the first point, a fourth member closest to the second point, a second member adjacent to the first member and a third member between the second and fourth members, wherein the first and third members have substantially the same thickness a and the second and fourth members have substantially the same thickness 1.41a, and wherein the second, third and fourth members are oriented so that their walk off directions are respectively 135, 180 and 225 degrees relative to that of the first member.

11. The device of claim 10, wherein the rotations of the elements are affected by temperature and wavelengths of the rays so that the rotation caused by each element will deviate by an error angle from a predetermined rotation angle, wherein the rotation caused by a first element will deviate by a first error angle df1, that caused by a second element will deviate by a second angle df2, that caused by a third element will deviate by a third angle df3, so that the coupling loss is proportional to $(\cos^2 df1)(\cos^2 df2)(\cos^2 df3)$, and so that the isolation is proportional to $(\sin^2 df1)(\sin^2 df2)(\sin^2 df3)$.

12. An optical nonreciprocal device for passing light in a forward direction from a first point to a second point and for reducing light passing in a reverse direction from the second point to the first point, said device comprising:

at least three anisotropic crystal members arranged in a linear array, each member having a walk off direction for separating light into ordinary and extraordinary rays; and at least two non-reversible rotation elements, wherein at least one element is interposed between every two adjacent anisotropic crystal members, and wherein rotations of the elements and the orientations and thicknesses of the members are such that light in the forward direction is separated into ordinary and extraordinary rays which are synthesized when they arrive at the second point, and that light in the reverse direction is separated into ordinary and extraordinary rays which substantially do not superpose each other at the first point, and so that light passing in the reverse direction is reduced in a manner which is substantially insensitive to temperature and wavelengths of the light passing in either direction, said device consisting of five anisotropic crystal members and four nonreversible rotation elements, wherein a first rotation element rotates rays of light at a first wavelength by about 45 degrees, a second element rotates rays of light at a second wavelength by about 45 degrees, a third and a fourth element rotates rays of light each by 45 degrees at a third and a fourth wavelength, wherein the third and fourth wavelengths are between the first and second wavelengths so that the device is effective for reducing light transmission in the reverse direction at both the first and second wavelengths and at wavelengths between the first and second wavelengths.

13. The device of claim 12, wherein the first wavelength is about 1.3 microns and the second wavelength is about 1.55 microns.

14. The device of claim 13, said third and fourth wavelengths are 1.37 and 1.44 microns respectively.

15. The device of claim 12, wherein the rotations of the elements are affected by temperature and wavelengths of the rays so that the rotation caused by each element will deviate by an error angle from a predetermined rotation angle, wherein the rotation caused by a first element will deviate by a first error angle df1, that caused by a second element will deviate by a second angle df2, that caused by a third element will deviate by a third angle df3, that caused by a fourth element will deviate by a fourth angle df4, so that the coupling loss is proportional to $(\cos^2 df1)(\cos^2 df2)(\cos^2 df3)(\cos^2 df4)$, and so that the isolation is proportional to $(\sin^2 df1)(\sin^2 df2)(\sin^2 df3)(\sin^2 df4)$.

16. An optical nonreciprocal device for passing light in a forward direction from a first point to a second point and for reducing light passing in a reverse direction from the second point to the first point, said device comprising:

at least three anisotropic crystal members arranged in a linear array, each member having a walk off direction for separating light into ordinary and extraordinary rays; and at least two non-reversible rotation elements, wherein at least one element is interposed between every two adjacent anisotropic crystal members, and wherein rotations of the elements and the orientations and thicknesses of the members are such that light in the forward direction is separated into ordinary and extraordinary rays which are synthesized when they arrive at the second point, and that light in the reverse direction is separated into ordinary and extraordinary rays which substantially do not superpose each other at the first point, and so that light passing in the reverse direction is reduced in a manner which is substantially insensitive to temperature and wavelengths of the light passing in either direction, said device consisting of five anisotropic crystal members and four nonreversible rotation elements, wherein the array comprises a first, second, third, fourth and fifth member arranged in such order with the first member closest to the first point and the fifth member closest to the second point, wherein the first and third members have thickness a, the second members thickness 1.41a, and the fifth thickness 2a, and wherein the second, third, fourth and fifth members are oriented so that their walk off directions are respectively 135, 180, 315 and 90 degrees relative to that of the first member.

17. The device of claim 16, wherein the rotations of the elements are affected by temperature and wavelengths of the rays so that the rotation caused by each element will deviate by an error angle from a predetermined rotation angle, wherein the rotation caused by a first element will deviate by a first error angle df1, that caused by a second element will deviate by a second angle df2, that caused by a third element will deviate by a third angle df3, that caused by a fourth element will deviate by a fourth angle df4, so that the coupling loss is proportional to $(\cos^2 df1)(\cos^2 df2)(\cos^2 df3)(\cos^2 df4)$, and so that the isolation is proportional to $(\sin^2 df1)(\sin^2 df2)(\sin^2 df3)(\sin^2 df4)$.

* * * * *

UNITED STATES PATENT AND TRADEMARK OFFICE
CERTIFICATE OF CORRECTION

PATENT NO. : 4,974,944

DATED : December 4, 1990

INVENTOR(S) : Kok W. Chang

It is certified that error appears in the above-identified patent and that said Letters Patent is hereby corrected as shown below:

Column 1, line 56, "sequentially a first" should read -- sequentially: a first --;

Column 3, line 28, "rotator Anisotropic" should read -- rotator. Anisotropic --;

Column 6, line 56 "light Therefore" should read -- light. Therefore --

Signed and Sealed this

Twenty-sixth Day of October, 1993

Attest:

BRUCE LEHMAN

Attesting Officer

Commissioner of Patents and Trademarks